J. V. ROBINSON.
AUTOMATIC AIR AND STEAM COUPLING.
APPLICATION FILED JUNE 20, 1910.
Reissued July 26, 1910.
13,138.
4 SHEETS—SHEET 1.
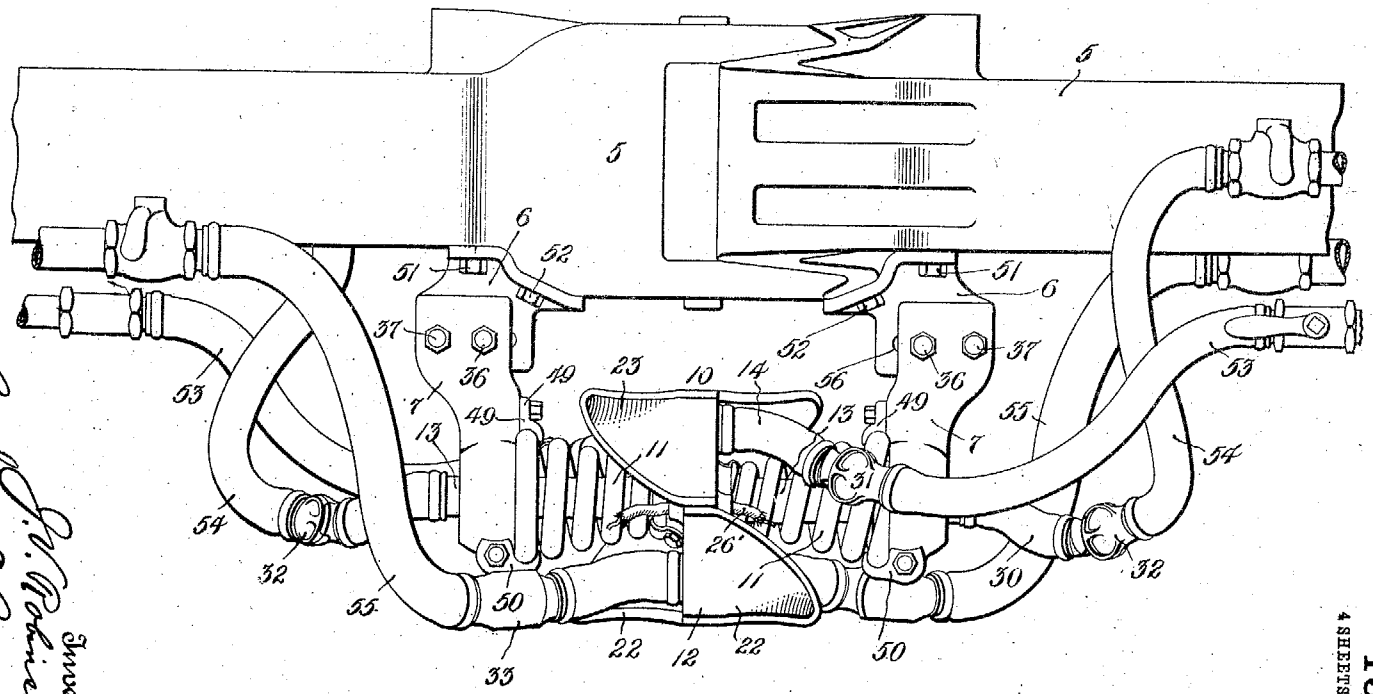
Witnesses
E. Larson
M. T. Taylor
Inventor
J. V. Robinson,
By Geo. L. Beeler and
G. Amos
Attorneys J. V. ROBINSON.
AUTOMATIC AIR AND STEAM COUPLING.
APPLICATION FILED JUNE 20, 1910.
Reissued July 26, 1910. 13,138.
4 SHEETS—SHEET 2.
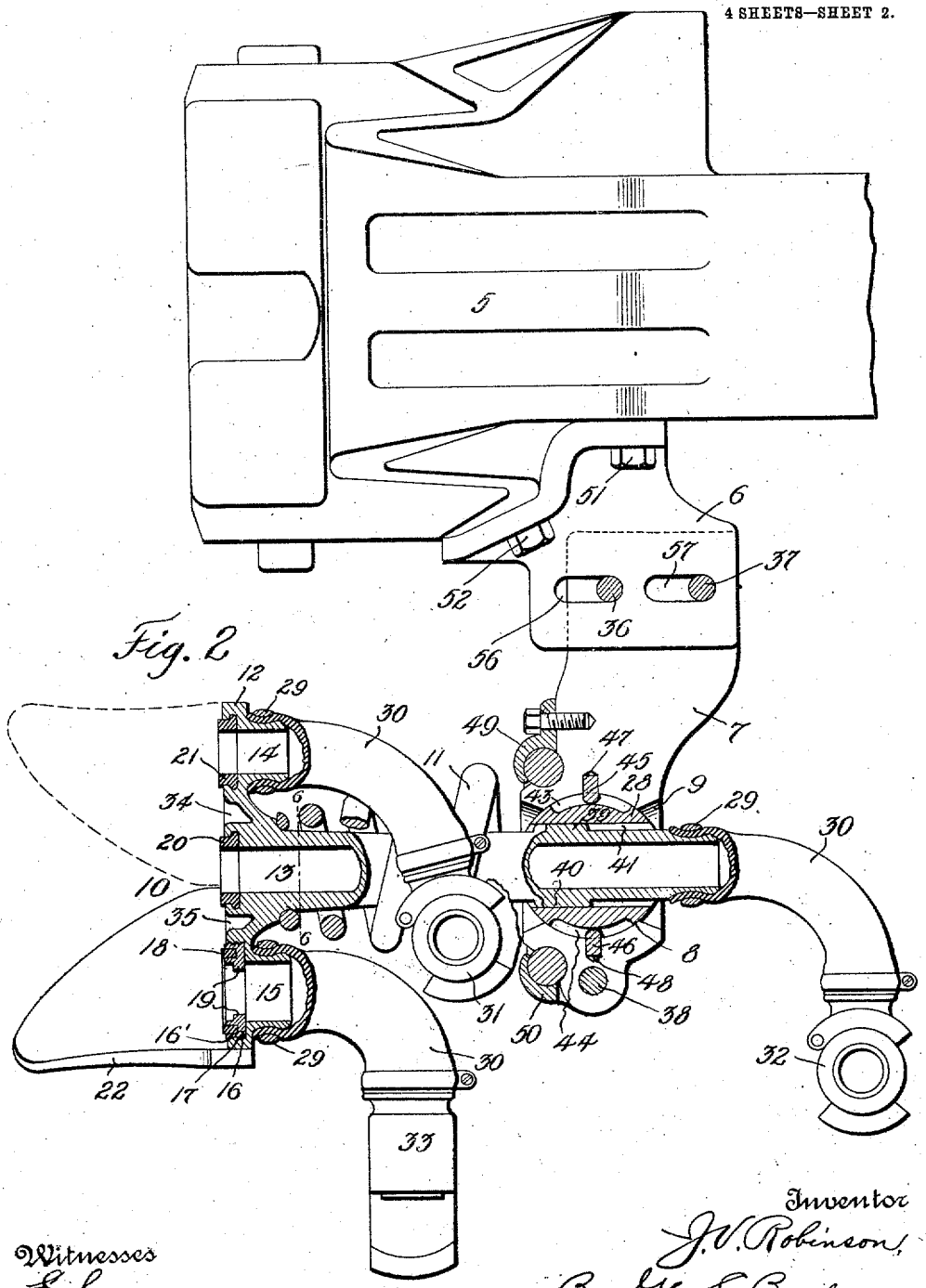
Witnesses
E. Larson
M. J. Taylor
Inventor
J. V. Robinson,
By Geo. L. Beeler and
G. Ayres Attorneys J. V. ROBINSON.
AUTOMATIC AIR AND STEAM COUPLING.
APPLICATION FILED JUNE 20, 1910.
Reissued July 26, 1910.
13,138.
4 SHEETS—SHEET 3.
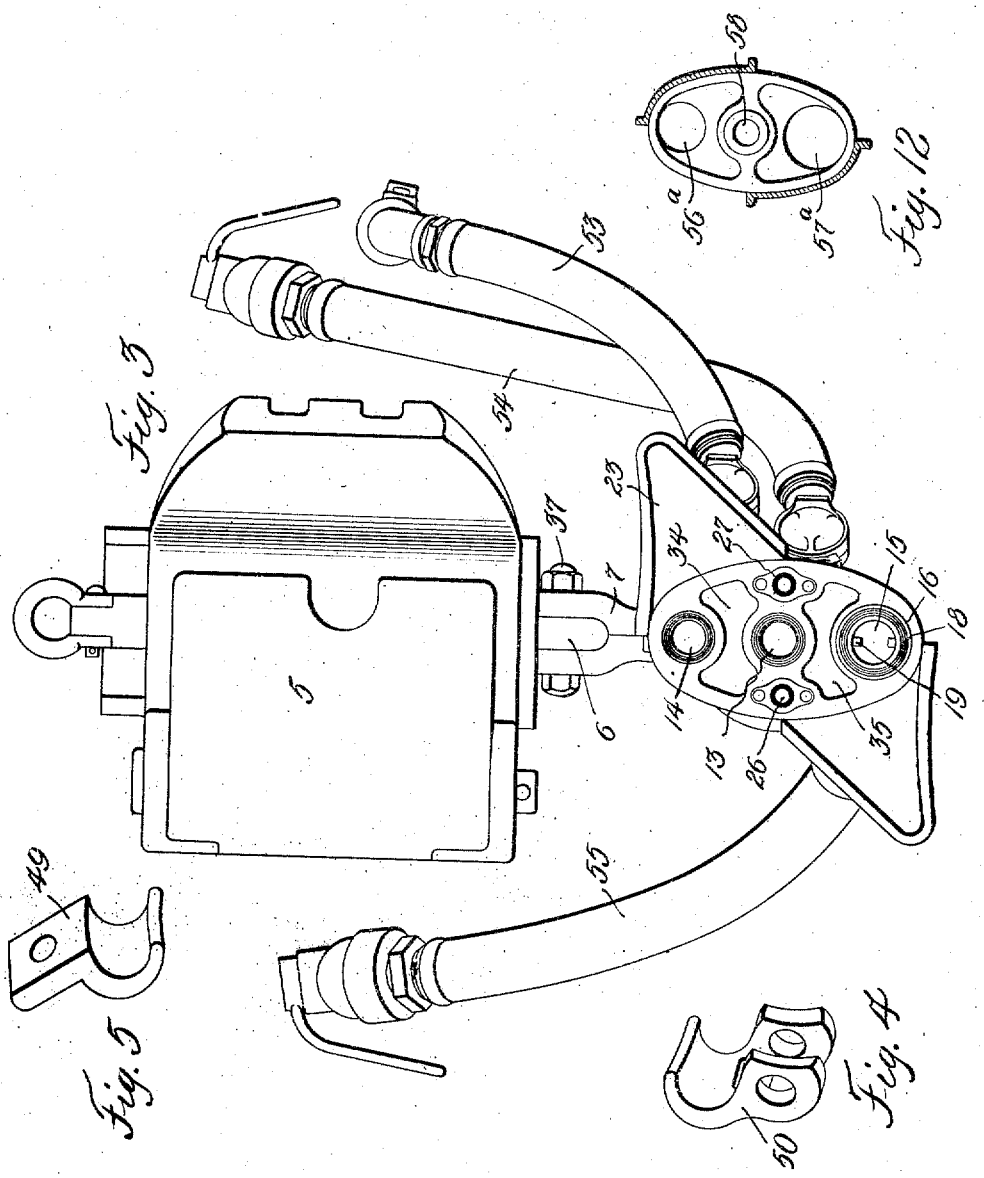
Witnesses
E. Larson
M. I. Taylor
Inventor
J. V. Robinson,
By Geo. L. Beeler and
G. Auro
Attorneys J. V. ROBINSON.
AUTOMATIC AIR AND STEAM COUPLING.
APPLICATION FILED JUNE 20, 1910.
Reissued July 26, 1910.
13,138.
4 SHEETS—SHEET 4.
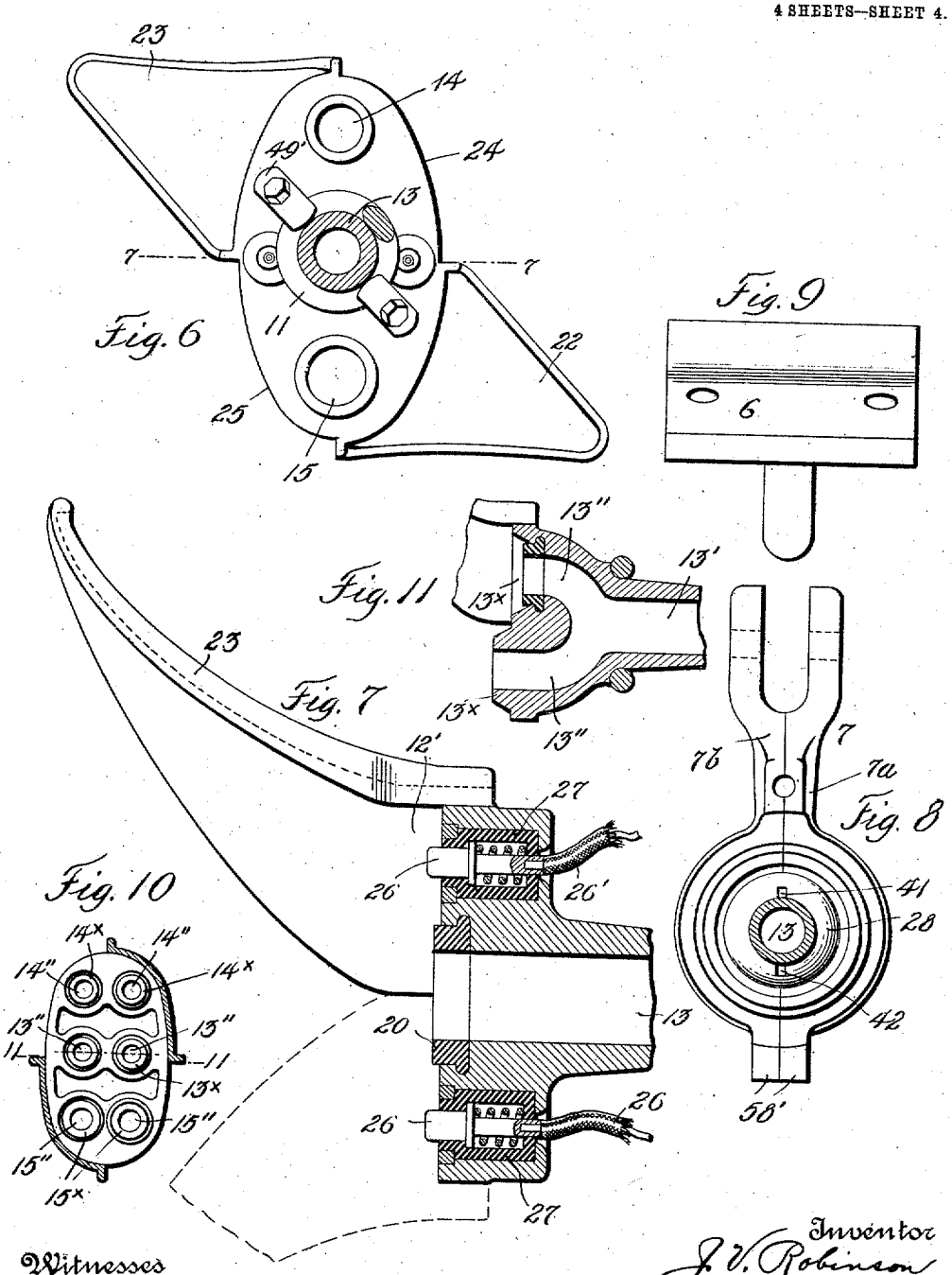
Witnesses
E. Larson
M. T. Taylor
Inventor
J. V. Robinson
By Geo. L. Beeler and G. Ayres Attorneys

UNITED STATES PATENT OFFICE.

JOSEPH V. ROBINSON, OF SALEM, OREGON.

AUTOMATIC AIR AND STEAM COUPLING.

13,138. Specification of Reissued Letters Patent. Reissued July 26, 1910.

Original No. 937,961, dated October 26, 1909, Serial No. 514,785. Application for reissue filed June 20, 1910. Serial No. 568,057.

*To all whom it may concern:*

Be it known that I, JOSEPH VINCENT ROBINSON, a citizen of the United States, residing at Salem, in the county of Marion and State of Oregon, have invented certain new and useful Improvements in Automatic Air and Steam Couplers, of which the following is a specification.

This invention relates to improvements in automatic signal air, brake air, and steam couplers for railway cars, the object of the invention being to provide an exceedingly simple, inexpensive, and effective coupler, whose members will automatically engage each other and bring all pipe connections directly together, forming an absolutely air and steam tight joint simultaneously with the coupling of the cars, and will in like manner become disengaged when the uncoupling of the cars takes place.

An important feature of the invention resides in the provision of a very advantageous means for supporting the coupling members in order that they may accommodate themselves to the swaying movement and inequalities in the height of various cars and tracks.

More particularly the invention includes the special construction of the coupling members and the particular manner in which they are connected with the supporting means therefor.

Another most essential feature of the invention resides in the mounting of the coupling members, wherein they are connected to their respective supporting brackets by means of ball and socket connections, and the invention involves broadly also the employment of springs coacting with the coupling members, so as to normally hold them in operative coupling position, at the same time permitting the necessary movement of the members to facilitate coupling thereof as cars are brought together.

In the accompanying drawings Figure 1 is a side elevation showing the invention applied to a draw-bar, the coupling members being connected together as when in actual use; Fig. 2 is a side elevation of one of the coupling attachments connected to a draw-bar, parts of the structure being shown in section; Fig. 3 is a front elevation of the structure shown in Fig. 2; Figs. 4 and 5 are detail perspective views of dogs hereinafter referred to; Fig. 6 is a rear view of one of the coupling heads taken on the line 6—6 of Fig. 2 with the hose connections being omitted; Fig. 7 is a fragmentary sectional view taken on the line 7—7 of Fig. 6; Fig. 8 is a view showing the supporting bracket in front elevation; Fig. 9 is a detail view of the lug to which the supporting bracket is secured; Fig. 10 is a sectional view of a modified form of coupling head; Fig. 11 is a fragmentary section taken on the line 11—11 of Fig. 10, and Fig. 12 is a section similar to Fig. 10 showing a modification in the coupling head.

Inasmuch as both members of the coupling are identical in construction and connected with the draw-bar of the car in the same manner, and since the manner in which the air and steam hose are attached to the head of the said members is exactly the same in both instances, the following detailed description will be limited to the manner of constructing and operating a single coupling member.

In the drawings 5 designates a general type of draw-bar used by modern railroads showing the air and steam coupler attached thereto by means of a lug 6, to which is secured a brace 7, provided with a ball socket 8, having a flared portion 9. The numeral 10 represents the coupling members carried by the brace or bracket 7 in said ball socket, said coupling member being normally supported in a horizontal operative position by means of a conical shaped tension spring 11, the metal of which is shown tapered from the base portion of the spring coil to the apex thereof, and the spring is positively connected at its ends to said brace and coupling member respectively. The use of the conical spring thus connected is important, because it has peculiar yielding functions readily permitting the coupling head 12 to move into various positions at an angle to the bracket 7, such movement being highly desirable in order to accommodate the coupling members to the swaying movement and inequalities in the height of various cars and tracks.

By this novel construction of spring, the coupler-head is yieldingly supported for universal movement from its normal coupling position, in such manner as to present a minimum resilient resistance upon the initial engagement and movement of said head and a rapidly augmented resistance upon continued movement of the head to its interlocked and coupled position, thereby eliminating the danger of distortion or failure of the coupler-heads by the troublesome battering action found to occur in previous constructions upon the initial contact of the heads, and insuring the maintenance of a perfect coupling under all practical conditions.

The coupling head 12 is provided with the brake air pipe 13, the signal air passage 14, and the steam heat passage 15, the latter having the seat 16 rigidly secured within the mouth thereof by means of threads 17. The member 16 is made of any suitable metal, preferably brass, and has a groove 16′ around its face within which is secured a slightly vulcanized rubber ring 18 extending slightly forward of the face of the said seat 16. The seat 16 has two inwardly projecting lugs 19 to facilitate removal thereof by a wrench or spanner.

In the ends of the brake air pipe 13 and the signal air passage 14 are secured resilient gaskets 20 and 21 extending about one thirty-second of an inch in advance of the face of the coupler.

Each coupling head 12 is provided with guides 22 and 23 located at opposite sides and ends of said head. The guides 22 and 23 project straight outward from the face of each head for a distance corresponding to the thickness of the head at its outer edge, as shown, and said portions of the guides form a straight walled socket 12′ which is extremely desirable, because the said socket is adapted to receive therein the spaced portions 24 and 25 of the opposite coupling head when the two heads are brought together. The edges 24 and 25 are fitted snugly between the straight walls of the socket 12′ of the coöperating head and are coextensive therewith whereby when the coupling is completed it is impossible for any outside lateral influence to accidentally cause the heads to buckle or tilt one upon the other. The peculiar formation of the guides 22 and 23 which provide the sockets 12′ also adds materially to the practicability of couplings of this type, by reason of the fact that the said construction prevents the faces of the heads 12 from a surface sliding movement independent of each other after the said heads have been coupled. When cars are being coupled together the heads 12 are lined up by means of the guides 22 and 23, said guides curving outwardly from the walled socket 12′ thereof, as shown in Fig. 7. When the heads come together the guides of one head, while lining up the same, enter the spaces 24 and 25 of the other head as before stated and the said heads practically wedge into the sockets 12′ of the guides during the above operation, thus making a rigid coupling.

Each head 12 may be provided with a pair of yieldable electric contacts 26 arranged at opposite sides of the brake air pipe 13, said electric contacts being for the purpose of connecting the lighting circuit between passenger coaches when such may be required, and are arranged in small casings of insulation shown at 27, and connected with suitable wires 26′, which are included in the lighting circuit of the car. The contacts 26 are brought together when the heads 12 are coupled, and it will be apparent therefore that when cars lighted by electricity are being connected, it is unnecessary for employees to go between the cars in order to make such electrical connections.

When the guides 22 and 23 line up with the couplers and bring them to a bearing the electrical contacts 26 are also effectively connected, and since the surfaces of the coupling heads are prevented from rubbing up and down, or sidewise when the cars are coupled, there is no unnecessary wear on the gaskets, and a perfect connection is insured. The steam heat seat 16 projects slightly in advance of the face of the coupler head, and the gasket therein assists in forming a steam tight connection when the two couplings are brought together.

Each head 12 projects about an inch and a half in advance of the pulling face of the draw-bar 5, and when the heads are brought together they will move rearwardly in a slidable manner through the guide ball 28 until the faces of the connector heads are in line with the pulling faces of the draw-bar 5, at which time the cars and air couplings will be effectively connected.

The air and steam pass-ways end in necks at the back of the head 12, around each of which is secured, by means of clamps 29, a piece of ordinary air and steam hose 30 of any suitable length, and in the ends of these hose are secured ordinary air and steam nipples 31, 32, and 33.

The cavities 34 and 35 are for the purpose of making the connector head lighter and rendering it easier for the spring 11 to hold the head in a normal horizontal position when the cars are disengaged.

The ball socket 8 of the bracket 7 is constructed of two pieces $7^a$ and $7^b$, see Fig. 8, held together by bolts 36, 37 and 38. Within the socket 8 is the guide ball 28 through which passes the air brake pipe 13, the latter having two lugs or keys 39 and 40 operating in key-ways 41 and 42 of the guide ball 28. The purpose of the lugs 39 and 40 is to prevent the air brake pipe 13 from turning within the guide ball. The said ball has grooves 43 and 44 formed on the upper and lower portions thereof into which project dowel pins 45 and 46, which are seated in sockets 47 and 48 in the adjacent portions of the bracket 7. Now inasmuch as the pipe 13 cannot rotate to the right or left in the ball 28, nor the ball roll to the right or left within the ball socket, the coupling head 12 cannot tilt to the right or left though it may freely oscillate, subject to the virtue of the spring, or move in various angular positions to the bracket, by reason of the ball and socket connection. Said spring 11 is attached to the ball socket by means of dogs 49 and 50, and to the back of the coupling head 12 by dogs 49′. The said dogs 49′ are spaced on the back of the coupling head at an angle to the direction in which they are spaced on the ball socket. While the head may move readily in any direction to the angle indicated by the tapered portion 9 of the ball socket, the spring 11 will always be held in position by the dogs as aforesaid, thus causing the spring to be placed under tension when the head moves, and as the normal position of the spring is horizontal, the same will always return to this position bringing with it the coupler head when the stress moving the same laterally is relieved. The axis of the spring 11 may be said to be concentric with the ball socket.

As the coupling heads are always carried by the draw-bars 5 there will be an equal distance between the two suspension points or lugs, always insuring the same tension upon the spring 11.

To attach the coupler to a draw-bar of a passenger coach or freight car it is but necessary to drill holes in the underside of the draw-bar, tap them out and secure the lug 6 thereto by means of screws 51 and 52. The bracket 7 may then be attached to the lug 6 by means of the bolts 36 and 37, the hose 53, 54 and 55 connected to the nipples 31, 32 and 33, and the coupler is then ready to automatically perform the work for which it is intended.

A very important advantage of the new coupler consists in being able to immediately make air and steam couplings with cars not equipped with the automatic device. To perform this operation it is but necessary to disconnect the car hose from the hose of the automatic coupler, and connect them to the hose of the car not equipped with the automatic device.

Under certain conditions of service it may be desirable to connect the train pipe coupling hose directly to the back portion of the coupling heads 12, omitting the short coupling hose 30.

By loosening the bolts 36 and 37 the coupler may be moved forward along the slots 56 and 57 of the lug 6 until the desired compression of the spring is brought to bear upon the connecting points of the coupler, thereby forming a perfect air and steam connection. Such adjustment may be made at any time but preferably at the time the connector is originally placed on the car.

The design of the coupler for freight cars, shown in Fig. 12, is substantially similar to that of the passenger car with the exception that instead of three pipes there is but one, the central brake air pipe 58. The holes or cavities $56^a$ and $57^a$ are provided for the purpose of permitting the signal air and steam pass-ways to enter without damage to the gasket or steam heat seat, when making a coupling between a freight car and passenger coach, or in other words, "mixing a train." An ear 58′ is made a part of each section of the bracket 7 and a dog 50 straddles the ears and is held in place by means of a bolt 38. The bracket 7 is made in two sections so as to enable the ball 28 to be easily placed therein when assembling the parts. As the device has a face contact no difficulty whatever will be encountered when separating the two couplers, nor will the air pipes beneath the car be in any manner affected when the cars are disconnected as is the case with devices now commonly in use.

Figs. 10 and 11 illustrate a modification of the invention in which the air brake pipe 13′ has its outer portion divided into branched ways 13″, and in like manner the signal air pass-way has branched portions 14″, and the steam heat pass-way the similar portions 15″. The outer ends of the branched pass-ways of the main pass-ways of each coupling head are formed with male and female portions at $14^x$, $15^x$ and $13^x$ respectively, said portions being adapted to match or fit snugly within similar portions of the adjacent head. It will be apparent that the increased number of the co-acting interlocking portions $14^x$, $15^x$ and $13^x$, will increase the tightness of the connections between the several pass-ways of the coupling heads in an advantageous manner.

Having thus described my invention, what I claim as new is:

1. In an automatic coupler, the combination of a supporting bracket, a coupling head supported at one end for oscillation in said bracket, train pipe connections attached to the head, a spring between the bracket and head, and means positively securing the ends of the spring to the bracket and head respectively, said spring and securing means constituting the only means for normally supporting the head in operative position for coupling and resisting the aforesaid oscillation.

2. In an automatic train pipe coupler, the combination of a supporting bracket, a coupling head supported at one end for oscillation in said bracket, train pipe connections attached to said head, a coiled spring between the bracket and head, and sets of dogs positively secured to the bracket and head and embracing the end coils of the spring, said spring and dogs constituting the only means for normally supporting the head in operative position for coupling and resisting the aforesaid oscillation.

3. In an automatic train pipe coupler, the combination of a support, a ball and socket mounted thereon, a coupling head mounted on the ball of said socket, devices coöperating with said ball to prevent rotation of the head with respect to the support, and train pipe connections with said coupling head.

4. In an automatic train pipe coupler, the combination of a support, a ball and socket device thereon, a coupling head slidably mounted on the ball, means to prevent rotation of the head with respect to the ball, a spring yieldably supporting the head in a predetermined position, and train pipe connections attached to the head.

5. In an automatic train pipe coupler, the combination of a support having a socket, a ball mounted in the socket, means for preventing the ball from rotating from right to left, a coupling head mounted on the ball for movement therewith, and train pipe connections attached to the head.

6. In an automatic train pipe coupler, the combination of a supporting bracket, a ball and socket device thereon, an oscillatory coupling head having a rearwardly extending brake air pipe slidable in the ball, said air pipe having lugs coöperating with the ball to prevent independent rotation of the head, a spring encircling said pipe and normally holding the head in a horizontal position, and train pipe connections attached to the head.

7. In an automatic coupler of the character set forth, the combination of a brace provided with a ball socket, a ball in said ball socket, a coupling head in front of said brace and having a pipe extending rearwardly through said ball in a horizontal direction, means to prevent rotation of said coupling head with respect to the brace while oscillation thereof is permitted through said ball, and means connected positively to the brace and the head to maintain the head normally in position with said pipe horizontal.

8. In a device of the character set forth, the combination of a brace having a ball socket, a ball in said socket, a coupling head including a pipe extending normally through said ball, means to prevent rotation of the ball around the axis of said pipe and yet permitting oscillation thereof in the brace in other directions, means to prevent rotation of said head and pipe with respect to the ball, and means to connect the said head to said brace.

9. In a device of the character set forth, the combination of a brace having an opening therethrough, a coupling head in front of said brace and including a pipe extending rearwardly through said opening and in which the coupling head and pipe may oscillate, and a spring connecting the head and brace together and normally holding the head with the pipe in horizontal position, said spring consisting of a conical spiral, the metal of which tapers from the base toward the apex thereof.

10. The combination of a brace comprising two parts, the adjacent faces of which are provided with a socket and terminating at their lower ends in registering ears, a coupling member including a pipe extending normally in a horizontal direction through said socket, a coiled spring between the said head and the said brace, and hook positively connecting said spring to the hea and to the brace, one of the said hooks em bracing said brace ears.

11. In an automatic train-pipe coupler, the combination of a coupler-head and resilient means secured to said head for resisting all movement of the latter from its normal coupling position by a varying force increasing in greater progression than the extent of such movement.

12. In an automatic train-pipe coupler, the combination of a coupler-head and a resilient support for normally maintaining said head with a minimum resistance in coupling position and for opposing movement of said head from such normal position by a varying resistance of greater proportional increase than that of such movement.

13. In an automatic train-pipe coupler, the combination of a coupler-head, resilient means secured to said head for resisting all movement of the latter from its normal coupling position by a varying force increasing in greater progression than the extent of such movement, and means for preventing excessive localization of stresses in said resilient means.

14. In an automatic train-pipe coupler, the combination of a support, a coupler-head, a conical spiral spring having coils of progressively decreasing thickness of material toward its apex, and means for positively securing the spring base and apex to said support and head, respectively.

15. In an automatic train-pipe coupler, the combination of a support, a coupler-head, a tapered rod coiled to constitute a conical spring, and means for positively securing the base and apex of said spring to said support and head, respectively.

16. In an automatic train-pipe coupler, the combination of a support, a coupler-head, a conical spiral spring having coils of progressively decreasing thickness of material toward its apex, means for positively securing the spring base and apex to said support and head, respectively, and means for confining said head against angular movement relative to the axis of said spring.

In testimony whereof I have hereunto set my hand in the presence of two witnesses.

JOS. V. ROBINSON.

Witnesses:
GEO. L. BEELER,
G. AYERS.